United States Patent [19]

Ike

[11] 4,408,826
[45] Oct. 11, 1983

[54] APPARATUS FOR SCANNING A LASER BEAM INCLUDING MEANS FOR FOCUSING A SCALE SCANNING BEAM AND A READ/WRITE SCANNING BEAM ON THE SAME FACET OF A POLYGON SCANNING MIRROR

[75] Inventor: Toshio Ike, Kamakura, Japan

[73] Assignee: Tokyo Shibaura Denki Kabushiki Kaisha, Kawasaki, Japan

[21] Appl. No.: 280,053

[22] Filed: Jun. 30, 1981

[30] Foreign Application Priority Data

Aug. 5, 1980 [JP] Japan .............................. 55-107278
Aug. 5, 1980 [JP] Japan .............................. 55-107279

[51] Int. Cl.³ ............................................. G02B 27/17
[52] U.S. Cl. ..................... 350/6.8; 250/236; 250/237 G
[58] Field of Search ............... 350/6.8, 6.7, 6.6, 6.5, 350/6.1, 433; 250/236, 235, 237 G, 578; 346/108

[56] References Cited

U.S. PATENT DOCUMENTS

| | | | |
|---|---|---|---|
| 3,573,849 | 4/1971 | Herriott et al. | 350/6.8 |
| 3,750,189 | 7/1973 | Fleischer | 350/433 |
| 3,865,465 | 2/1975 | Tatuoka et al. | 350/433 |
| 4,350,988 | 9/1982 | Masegi | 346/108 |

FOREIGN PATENT DOCUMENTS 49-29713  3/1974  Japan .

*Primary Examiner*—Jon W. Henry
*Attorney, Agent, or Firm*—Finnegan, Henderson, Farabow, Garrett & Dunner

[57] ABSTRACT

Apparatus for scanning a laser beam including a beam splitter for splitting a laser beam into a scale scanning beam and a read/write scanning beam, a modulator for applying information to the read/write scanning beam, lenses and mirrors, including a cylindrical lens for directing both beams onto the same facet of a rotating polygonal scanning mirror, and a lens for focusing the modulated beam to a spot on a scanned medium and for focusing the unmodulated beam through a scale onto a detector for providing timing pulses for the apparatus.

2 Claims, 2 Drawing Figures

APPARATUS FOR SCANNING A LASER BEAM INCLUDING MEANS FOR FOCUSING A SCALE SCANNING BEAM AND A READ/WRITE SCANNING BEAM ON THE SAME FACET OF A POLYGON SCANNING MIRROR

BACKGROUND OF THE INVENTION

This invention relates to an apparatus for scanning a laser beam.

FIG. 1 is an overall view of a former laser beam scanning apparatus. A laser tube 10 generates a beam 11. The beam 11 passes through a modulator 12 and optical elements 13 thus becoming a read/write scanning beam 14. The beam 14 is scanning by a rotating polygon scanner 15. The polygon scanner 15 has a plurality of reflecting facets and is rotated by a motor 16. The beam 14 reflects on successive ones of the facets of the polygon scanner 15 and is then scanned at a reading or recording station 17.

Concurrently, a laser tube 20 located on the opposite side of the scanner 15 from the laser tube 10 generates a beam 21. The beam 21 passes through optical elements 22 as a scale scanning beam. The beam 21 is reflected on successive ones of facets of the polygon scanner 15 and is then scanned on a scale 23 for generating sampling pulses. The sampling pulses are used as timing pulses for reading or recording of information on the beam 14.

The laser 10, modulator 12 and optical elements 13 are, therefore, located on the opposite side of the polygon scanner 15 from laser tube 20 and optical elements 22. Accordingly, these tubes and optical elements take up a large space and cannot be used in common. The result is a very expensive apparatus.

In addition, the beams 14 and 21 simultaneously reflect on different facets of the polygon scanner 15. The reflection on the different facets may cause scanning non-linearity because of differing conditions of the surfaces of the facets.

If it is desirable to reduce the optical distance between the polygon scanner 15 and the scale 23, the scale 23 will have to be made smaller. It is difficult to manufacture an accurate smaller scale. Dust or stains accumulating on the scale 23 cause irregular reflections of the beam 21 on the scale with the result that correct timing pulses are not obtained.

SUMMARY OF THE INVENTION

It is therefore an object of this invention to improve laser beam scanning apparatus so as to use a common laser tube and optical elements for the read/write scanning beam and the scale scanning beam.

It is another object of this invention to provide laser beam scanning apparatus in which the read/write scanning beam and the scale scanning beam reflect on the same facet of a rotating polygon mirror.

According to this invention, an apparatus for scanning a laser beam comprises laser means for generating a single collimated beam, a beam splitter for permitting a portion of the collimated beam to pass therethrough and for redirecting another portion of the collimated beam, a modulator for modulating only one of the beam portions, a rotating polygon scanner, means for directing both of said beam portions on the same facet of said polygon scanner, said directing means including a cylindrical lens for focusing said beam portions on a reflecting point of said same facet of said polygon scanner, a scale having precisely spaced means thereon for receiving the unmodulated beam, a scanning lens for focusing the modulated and the unmodulated beam portions, as reflected by said polygon scanner, to a scanned medium and on the scale, respectively, and detecting means for receiving the unmodulated beam portions passing through said spaced means and for producing timing pulses for said apparatus.

DETAILED DESCRIPTION OF THE INVENTION

Figure 1:
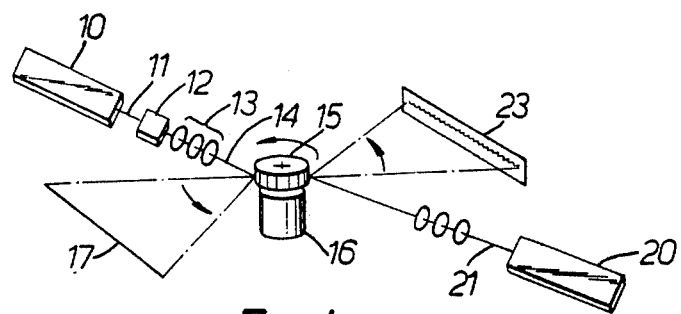
FIG. 1 is an overall view of a former apparatus for scanning a laser beam.
Figure 2:
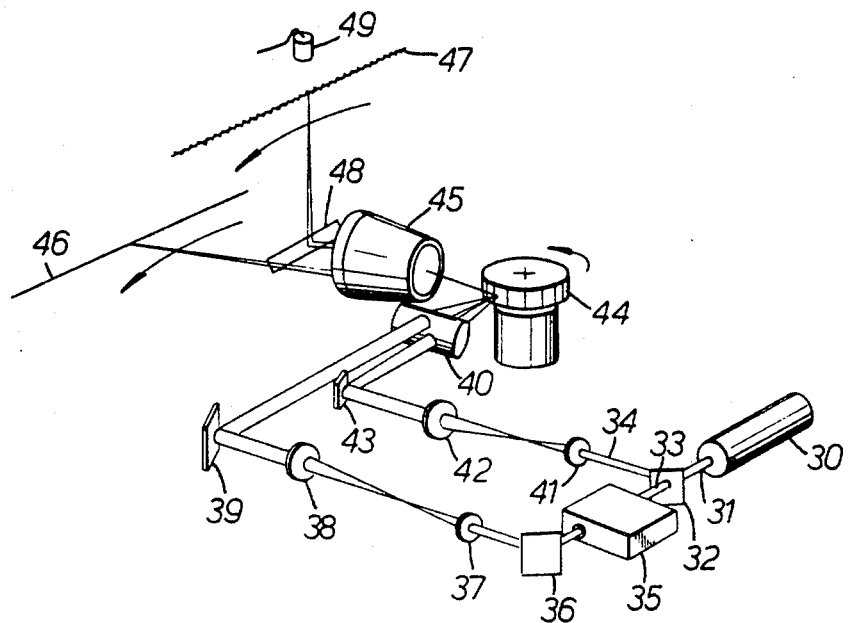
FIG. 2 is an overall view of an apparatus for scanning a laser beam according to this invention.

Referring to FIG. 2, a laser 30 generates a collimated beam 31. A beam splitter 32, located in the path of the beam 31, allows a portion 33 of the beam to pass therethrough to become a read/write scanning beam and reflects a portion 34 of the beam as a scale scanning beam.

An acousto-optic modulator 35 modulates the beam 33 in conformance with electrical signals. The modulated beam 33 is reflected by a stationary mirror 36, passes through lenses 37 and 38, and is reflected by a stationary mirror 39 to a cylindrical lens 40.

The reflected scale scanning beam 34 passes through lenses 41 and 42, as an unmodulated beam, and is reflected by a stationary mirror 43 to the cylindrical lens 40.

These beams 33 and 34 are expanded each to its respective proper scanning spot size by the lenses 37, 38 and 41, 42.

After passing through the cylindrical lens 40, the beams 33 and 34 are reflected by a polygon scanner 44. The polygon scanner 44 has a plurality of reflecting facets which successively scan the beams.

The beams 33 and 34 are off-axis of the cylindrical lens 40, but their optical axes are parallel to the optical axis of the cylindrical lens. The cylindrical lens 40 is located to focus the beams 33 and 34 on a reflecting point on each of the facets of the polygon scanner 44. That is, the beams 33 and 34 are reflected on a reflecting point which is on the same facet of the polygon scanner 44. It is preferable that the beams 33 and 34 be focused on the same reflecting point.

The beams 33 and 34 pass through a scanning lens 45 after being reflected by the polygon scanner 44. The scanning lens 45 focuses the beams 33 and 34 to a proper spot, respectively, on a scanned medium 46 and a scale 47. The distance between the reflecting point on the facet of the polygon scanner 44 and the scale 47 is always optically equal to the distance between the reflecting point on the facet and the scanned medium.

The beam 34 is reflected by a mirror 48 to the scale 47. The beam 34 is scanned on the scale 47 for generating timing pulses. The scale 47, for example, is made of glass on which stripes such as Cr are gilt at fixed intervals in its longitudinal direction. The beam 34 is alternately blocked by the stripes on the scale 47 and allowed to pass through the glass between the stripes. The beam 34 is scanned across the scale 47 from one end to the other end at the speed based on the polygon scanner 44. The beam 34 passing through the scale 47 is reflected back by a concave mirror (not shown) to be received by a photoelectric detector 49, such as a photoelectric diode. The detector 49, thereby produces timing pulses at fixed timing. For simplicity, the detector 49 is schematically shown as on the opposite side of the scale 47 from the scanning lens 45.

The beam 33 is scanned across the scanned medium 46, as known in the art. The scanned medium 46 may be a reading station for reading a stationary document or an imaging station for recording an image thereon.

The timing pulses are used for basic timing signals and are applied, for example, to the modulator 35. The beam 33 is scanned according to the timing pulses.

The diameter of the scale scanning beam 34 applied to the scale 47 is smaller than the diameter of the read-/write scanning beam 33 applied to the medium 46. To obtain properly timing pulses, it is necessary that the beam 34 be completely blocked by each stripe on the scale 47. That is, there must be no leakage of light on each side of a stripe to be sensed by the detector 49. For this reason, the spot size of the beam 34 at this scale 47 must be quite small to avoid production of irregular pulses.

On the other hand, such a narrow beam may cause a point on the scanned medium 46 to be missed by the read/write scanning beam 33. For this purpose, the spot size of the beam 33 is made large enough that successive positions of the beam overlap each other on the medium 46.

The beams 33 and 34 are reflected on the same facet of the polygon mirror 44, as stated previously. The beam paths are located very near each other. Accordingly, the laser tube and optical elements such as the polygon scanner 44 and the cylindrical lens 45 can be used in common. The apparatus will, therefore, be smaller than the former apparatus. Furthermore, since the same facet is utilized for both beams, the surface of the facet of the polygon scanner does not cause non-linearity of the scanning beams.

The distance between the reflecting point on the facet of the polygon scanner 44 and the scale 47 is optically equal to the distance between the reflecting point on the facet and the scanned medium 46. The scale 47 is relatively longer than the one formerly used. Accordingly, the distance between stripes on the scale 47 may be made longer than previously. Although the spot size of the scale scanning beam must be made smaller, it need not be made as small as previously. With the wider distance between the stripes, dust or other foreign material is not so likely to accumulate between the stripes and to cause the laser beam to be reflected irregularly.

What is claimed is:

1. An apparatus for scanning a laser beam, the apparatus comprising:
    laser means for generating a single collimated beam;
    a beam splitter for permitting a portion of said collimated beam to pass therethrough and for redirecting another portion of said collimated beam as an unmodulated beam;
    a modulator for modulating only one of said beam portions to a modulated beam;
    a rotating polygon scanner;
    means for directing both of said beam portions on the same facet of said polygon scanner, said directing means including a cylindrical lens for focusing said beam portions on a reflecting point of said same facet of said polygon scanner, said beam portions being off the axis of the cylindrical lens;
    a scale having precisely spaced means thereon for receiving the unmodulated beam;
    a scanning lens for focusing the modulated and the unmodulated beam portions, as reflected by said polygon scanner, to a scanned medium and on the scale, respectively; and
    detecting means for receiving the unmodulated beam portion passing through said spaced means and for producing timing pulses for said apparatus.

2. The apparatus for scanning a laser beam according to claim 1, wherein the distance between said reflecting point on said facet of said polygon scanner and said scale is always optically equal to the distance between said reflecting point on said facet and said scanned medium.

* * * * *